United States Patent [19]

Iwata et al.

[11] 4,009,866
[45] Mar. 1, 1977

[54] EXPOSURE CONTROL DEVICE

[75] Inventors: Hiroshi Iwata, Osaka; Katsuji Ishikawa, Higashi-Osaka, both of Japan

[73] Assignee: West Electric Company, Ltd., Japan

[22] Filed: Oct. 14, 1975

[21] Appl. No.: 621,845

[30] Foreign Application Priority Data

Oct. 18, 1974 Japan .......................... 49-120900

[52] U.S. Cl. .................................. 354/29; 354/44; 354/60 A
[51] Int. Cl.² .......................................... G03B 7/14
[58] Field of Search ............ 354/23 D, 29, 38, 43, 354/44, 60 R, 60 A

[56] References Cited

UNITED STATES PATENTS

| | | |
|---|---|---|
| 3,813,680 | 5/1974 | Wagensonner et al. .............. 354/44 |
| 3,882,522 | 5/1975 | Erlichmann ........................ 354/44 |

*Primary Examiner*—Russell E. Adams, Jr.
*Attorney, Agent, or Firm*—Burgess Ryan and Wayne

[57] ABSTRACT

In an exposure control device of the type comprising exposure means including a plurality of shutter blades which also function as the aperture setting blades, and a step-motor drivingly coupled to said shutter blades for causing them to open and close stepwise so as to define an aperture; and pulse signal generating means adapted to generate the driving pulse or pulses to be applied to said step-motor dependng upon the brightness of a subject, means is provided for locking the step-motor in an inoperative position when the shutter blades remain closed in order to prevent an erratic exposure due to the mechanical shock.

4 Claims, 9 Drawing Figures

EXPOSURE CONTROL DEVICE

BACKGROUND OF THE INVENTION

The present invention relates to generally an exposure control device and more particularly an exposure control device of the type which may positively prevent mechanical shock from causing an erratic exposure due to the erratic rotation from an inoperative position of a step-motor for driving a plurality of shutter blades which also function as the aperture setting blades.

There have been devised and demonstrated various exposure control devices of the type in which a plurality of shutter blades which also function as the aperture setting blades are opened and closed by a step-motor which in turn is driven in response to driving pulse or pulses the number of which is dependent upon the brightness of a subject, whereby the optimum exposure may be made. They are, for example, disclosed in the copending applications filed by the same inventors, Application Ser. Nos. 550,367 filed on Feb. 18th, 1975, 567,231 filed on Apr. 11th, 1975, and 569,006 filed on Apr. 17th, 1975. These exposure control devices have a common object for overcoming the defects encountered in the prior art exposure devices of the type in which the governor or moving coil is used for driving the shutter blades which also function as the aperture setting blades.

In general, in the prior art exposure control devices disclosed in the above copending applications include a first control circuit and a second control circuit. The first control circuit is for controlling the selective energization of a plurality of driving coils or windings of a step-motor so that the latter may rotate through a discrete angle in response to each driving pulse. The second control circuit, which, for instance, includes a shift register, is for controlling the direction of rotation of the step-motor. When the driving coils of the step-motor are energized, the step-motor is rotated through a predetermined angle, and is securely held in position by the magnetic forces produced by the energization of the driving coils. Therefore, the erratic rotation of the step-motor due to the mechanical shock or the like will hardly occur. However, when the driving coils are not energized, the step-motor is held in position only by the magnetic forces of permanent magnets of the rotor or stator. These forces are very weak as compared with the forces produced when the driving coils are energized. As a result, the erratic rotation of the step-motor due to the shock or the like very frequently tends to occur when the driving coils are not energized. Since the step-motor is drivingly coupled to the shutter blades, the mechanical shock or the like imparted to them also tends to cause the erratic rotation of the step-motor, resulting in an erratic exposure. Furthermore, if the step-motor fails to return to its correct initial position (to be referred to as "inoperative position" in this specification), an erratic exposure results.

SUMMARY OF THE INVENTION

One of the objects of the present invention is therefore to provide a step-motor locking means for securely locking the step-motor in its initial or inoperative position when the exposure operation is not made, thereby preventing an erratic exposure.

To the above and other ends, in the exposure control device of the type consisting of a plurality of shutter blades which also function as the aperture setting blades and a step-motor for driving the shutter blades, the present invention provides first control means for controlling the step-motor to open and close the shutter blades so that the optimum exposure may be attained depending upon the brightness of a subject; step-motor locking means for securely locking the step-motor in its initial inoperative position when the exposure operation is not made, thereby preventing an erratic exposure; and second control means for controlling the step-motor locking means.

DESCRIPTION OF THE PREFERRED EMBODIMENTS

Figure 1A:
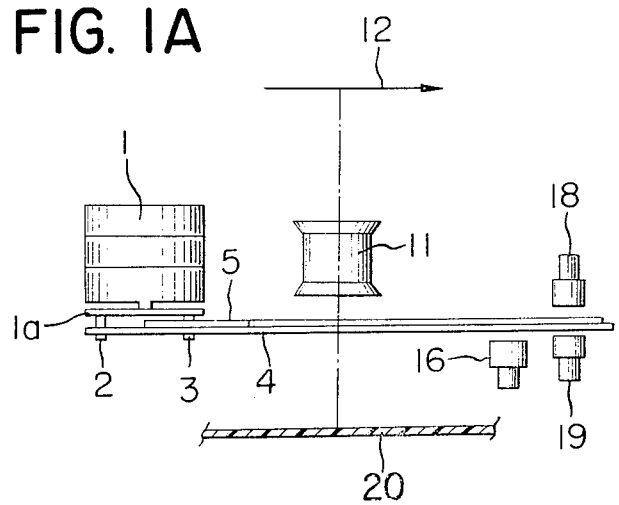
FIG. 1A is a schematic top view of exposure control means of one preferred embodiment of the present invention.
Figure 1B:
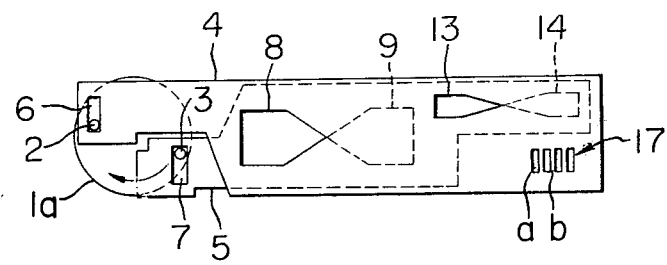
FIG. 1B is a schematic front view thereof showing shutter blades in closed position.
Figure 1C:
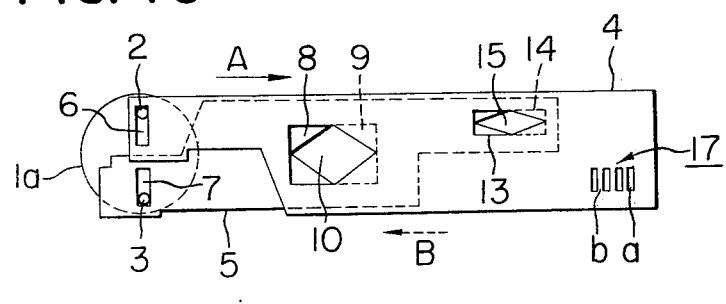
FIG. 1C is a view similar to FIG. 1B showing the shutter blades in wide opened position.

Referring to FIGS. 1A, 1B and 1C, a step-motor 1 is of the conventional type and rotates through an angle in proportion to the number of driving pulses received. Two driving pins 2 and 3 are extended in parallel with the driving shaft of the step-motor 1 from a disk 1a attached to the shaft, and are loosely fitted into guide slots 6 and 7, respectively, of shutter blades 4 and 5. The shutter blades 4 and 5 have main openings 8 and 9 which define a main aperture 10 as will be described in detail hereinafter, auxilary openings 13 and 14 which define the auxiliary aperture 15 (See FIG. 1C) as will be described in detail hereinafter, and gratings 17 each with a plurality of slits $a$ and opaque or light shielding spaces $b$ therebetween.

FIG. 1B shows the shutter blades 4 and 5 in the inoperative position; that is, when the shutter button (not shown) is not depressed, but when the step-motor 1 is rotated in the direction indicated by the arrow in FIG. 1B in response to the driving pulse or pulses applied thereto in a manner to be described in detail hereinafter, the shutter blades 4 and 5 are displaced in the opposite directions relative to each other as indicated by the arrows A and B in FIG. 1C so that the main and auxiliary openings 8 and 9 and 13 and 14 overlap to define the main and auxiliary apertures 10 and 15, respectively. As a result, a subject 12 is focused through a lens 11 and the main aperture 10 on a film 20 (See FIG. 1A), and the light from the subject 12 is intercepted through the auxiliary aperture 15 by a photocell 16 for the purpose to be described hereinafter. Since the step-motor 1 rotates through a predetermined angle in response to one driving pulse, the opening area of the main aperture 10 is increased stepwise. The increase in the opening area of the main aperture 10 in response to one driving pulse may be arbitrarily selected by suitably selecting the configuration of the main openings 8 and 9 and the configuration and position of the guide slots 6 and 7. In the instant embodiment, it is assumed that in response to one, two and three driving pulses applied to the step-motor 1, the shutter blades 4 and 5 are so displaced as to define the opening areas of the main aperture 10 corresponding to stopping down the lens to f-16, f-8 and f-4, respectively.

In like manner, the opening area of the auxiliary aperture 15 defined by the auxiliary openings 14 and 15 changes stepwise. That is, in the instant embodiment, the opening area is minimum when the main aperture 10 is closed while it is maximum when the main aperture 10 is wide opened. The auxiliary aperture 15 is therefore provided in order to control the quantity of the light from the subject 12 to be intercepted by the photocell 16 in proportion to the opening area of the main aperture 10. As a result, the time constant of a photometric circuit including the photocell 16 to be described in detail hereinafter may be changed in response to the brightness of the subject 12.

The gratings 17 are provided in order to intermittently interrupt the light emitted from a light source 18 from being intercepted by a photocell 19 (See FIG. 1A) as the shutter blades 4 and 5 are displaced in the opposite directions, whereby the pulse signals may be generated for the purpose to be described hereinafter. The gratings 17 are therefore to be sometimes referred to as "the signal-generating gratings" hereinafter in this specification. As described above, the signal-generating gratings 17 are provided in order to generate pulse signals. The gratings are, however, only a single example of a pulse signal generator, and any suitable signal generating means may be used to accomplish the same purpose. For instance, a plurality of permanent magnets may be attached on the shutter blade 4 in such a way that the opposite polarity poles S and N may be alternately arrayed while a suitable magnetic flux detecting element such as a Hall element may be attached to the shutter blade 5. Alternatively, a plurality of electrical contacts may be attached to the shutter blade 4 in suitably equidistantly spaced apart relation while a wiper or the like may be attached to the shutter blade 5 in such a way that it may be normally made in contact with one of the contacts on the shutter blade 4. In both instances, the relative displacement between the shutter blades 4 and 5 may be detected magnetically and electrically.

Figure 2:
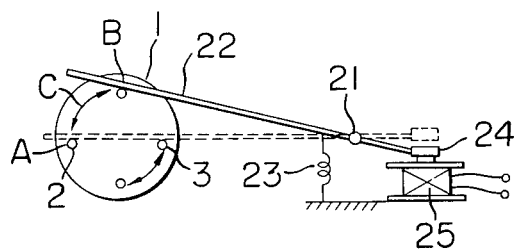
FIG. 2 is a schematic side view of a step-motor locking means in accordance with the present invention.

Next referring to FIG. 2, a locking device for securely holding the step-motor 1 in the initial or inoperative position will be described. The locking device shown in FIG. 2 includes a rotatable arm 22 pivoted with a pivot pin 21 and having an armature 24 firmly attached to the right end thereof, and an electromagnet 25 positioned below the armature 24. A bias spring 23 is provided in order to normally bias the rotatable arm 22 in the counterclockwise direction so that the left end portion of the arm 22 may firmly press against the driving pin 2 at the shutter-closing position A. Therefore, the rotation of the step-motor 1 in the direction in which the shutter blades 4 and 5 are opened may be positively prevented.

In order to permit the discrete angular rotations of the step-motor, the electromagnet 25 is so operatively coupled to the shutter release button (not shown) that it may be energized when the shutter button is depressed as will be described in detail hereinafter. Then, the electromagnet 25 attracts and holds the armature 24 of the arm 22 so that the arm 22 is rotated in the clockwise direction to the retracted position indicated by the solid lines in FIG. 2. Therefore, the driving pin 2 is permitted to be displaced stepwise along the arcuate path C between the step-motor locking position A and the retracted position B. When the driving pin 2 reaches the position B, the main aperture 10 is wide opened; that is, it has the maximum opening area.

After the driving pin 2 has returned to its initial or step-motor locking position A, the electromagnet 25 is deenergized as will be described in detail hereinafter so that the arm 22 returns to its initial or locking position indicated by the broken lines in FIG. 2 under the force of the bias spring 23. Therefore, the arm 22 securely locks the step-motor 1 in the inoperative position as described above so that an erratic exposure due to the mechanical shock or impact may be completely avoided.

Figure 5A:
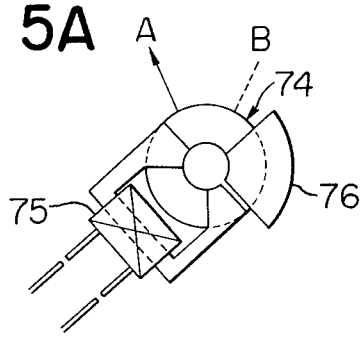
FIGS. 5A, 5B and 5C are three views of a modification of the step-motor locking means shown in FIG. 2.
Figure 5B:
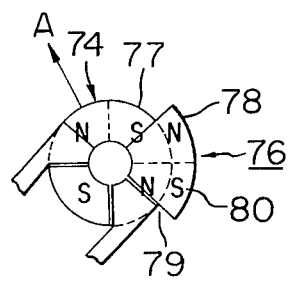
Figure 5C:
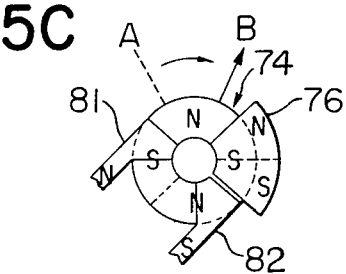

Instead of the combination of the bias spring 23 and the electromagnet 25, an arm locking device of the type shown in FIG. 5 may be used. A rotatable disk-shaped permanent magnet 74 having four segments arrayed alternately (See FIG. 5B) is attached to a rotary shaft of the arm 22. A stationary permanent magnet 76 is positioned in opposed relation with the rotatable disk-shaped permanent magnet 74 in such a way that when an electromagnet 75 is not energized, the N-pole 78 and S-pole 80 of the stationary permanent magnet 76 attract the S-and N-poles 77 and 79 of the rotatable disk-shaped permanent magnet 74 as shown in FIG. 5B. Under the above condition, the step-motor 1 is firmly held in the step-motor locking position. When the electromagnet 75 is energized the N-and S-poles thereof attract S-and N-poles, respectively, of the rotatable disk-shaped permanent magnet 74 so that the latter is rotated through a predetermined angle as shown in FIG. 5C. As a result, the arm 22 is rotated in the clockwise direction to the retracted position (solid lines in FIG. 2) as with the case of the device shown in FIG. 2. Therefore, the discrete angular rotations of the step-motor 1 is permitted.

After the exposure, the electromagnet 75 is deenergized so that the rotatable disk-shaped permanent magnet 74 returns to its initial or locking position. Therefore, the step-motor 1 is securely locked in position.

Figure 3:
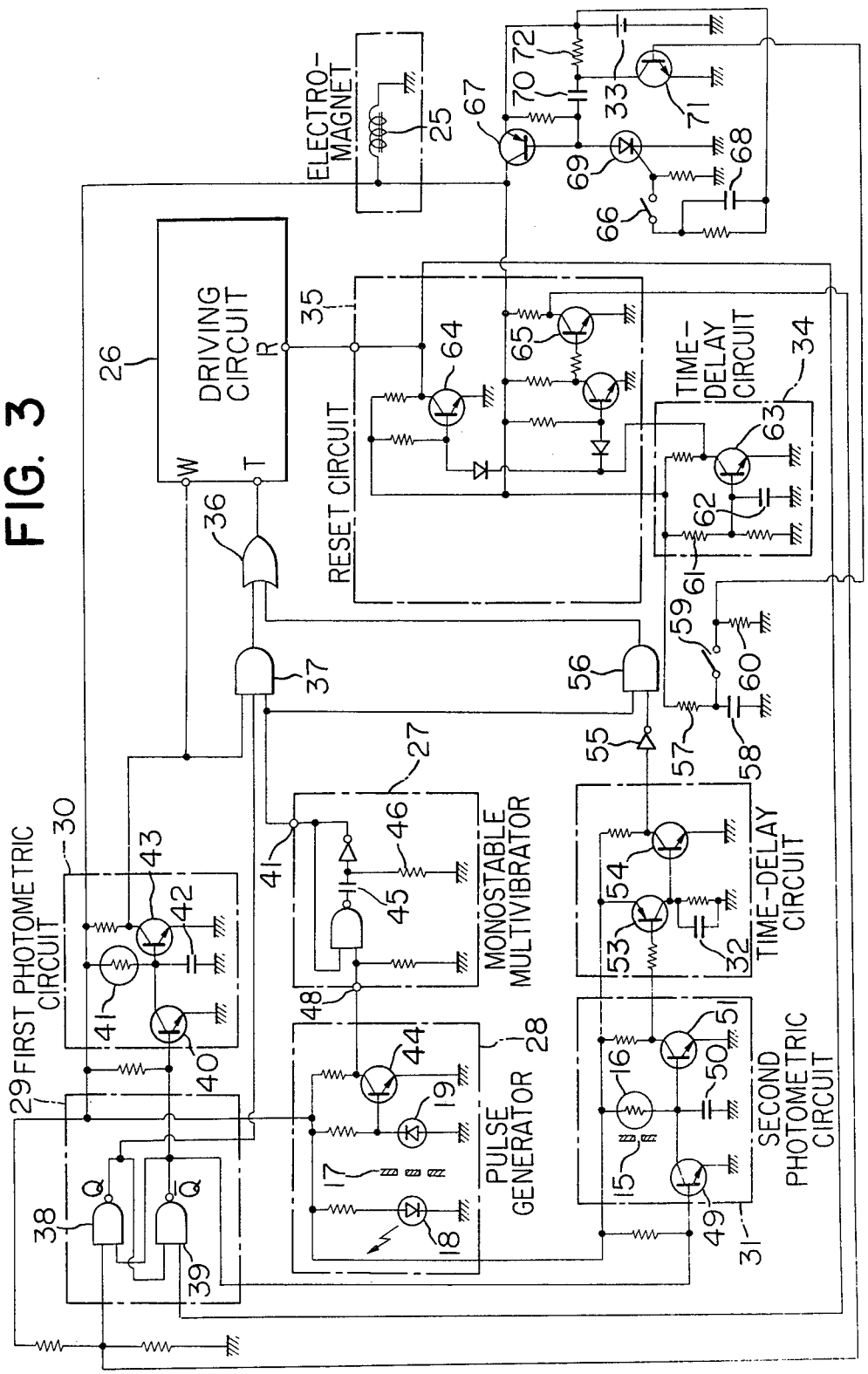
FIG. 3 is a diagram of an electronic control circuit of the preferred embodiment.
Figure 4:
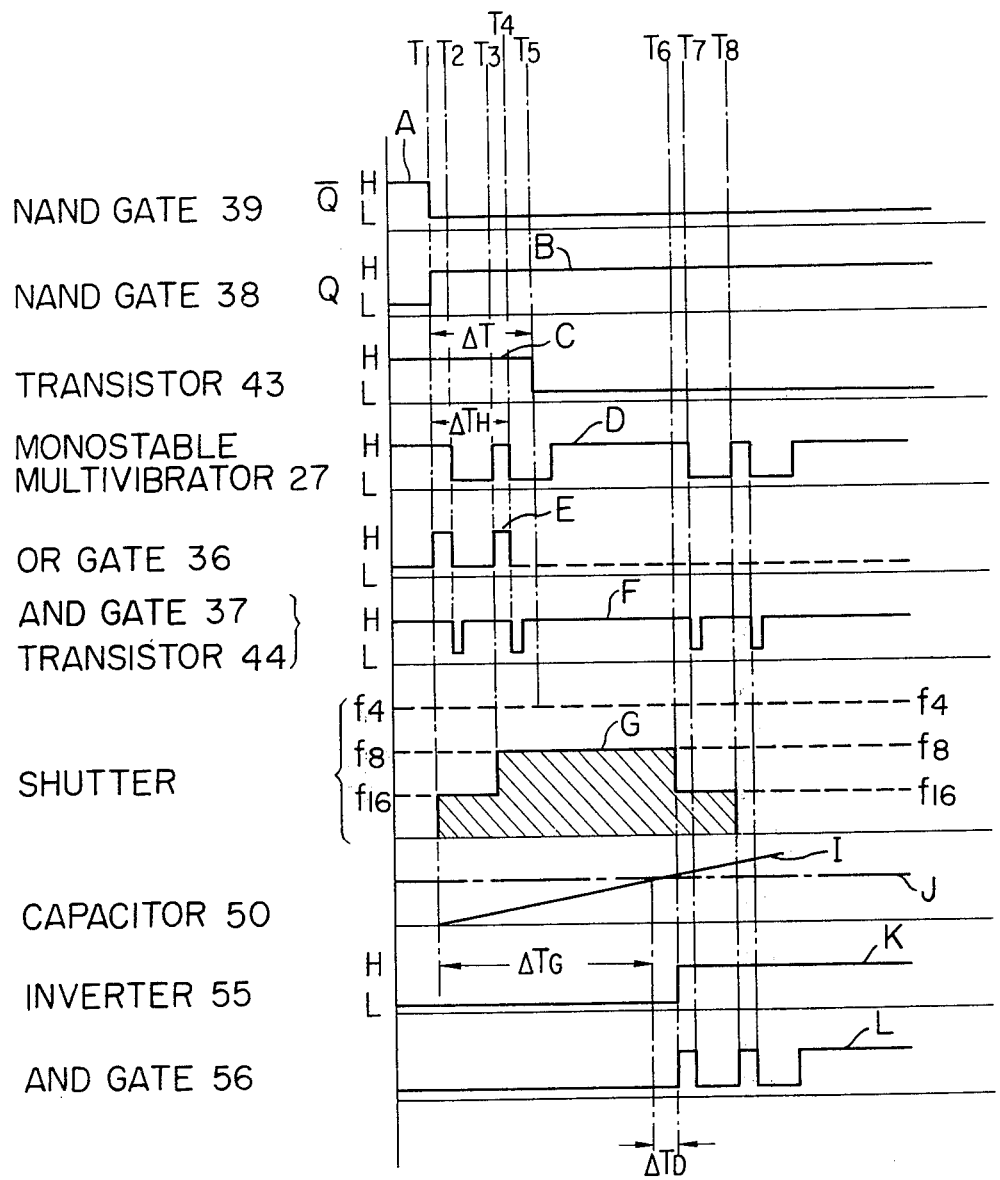
FIG. 4 is a time chart used for the explanation thereof.

Next referring to FIGS. 3 and 4, the electronic control circuit will be decribed. When the shutter button (not shown) is depressed, a switch 66, which is operatively interlocked with the shutter button, is closed so that the current from a power supply 33 flows into the gate of a thyristor 69, causing the latter to turn on. As a result, a transistor 67 becomes conductive so that the power is supplied from the source 33 to various circuits. The electromagnet 25 (See FIG. 2) is energized so that the step-motor 1 is released in the manner described hereinbefore. A first photometric circuit 30 and a second photometric circuit 31 and a driving circuit 26 are also reset for the next exposure. In order to provide a sufficient time for the arm 22 (See FIG. 2) to retract itself to the inoperative position B and to reset a reset circuit 35 before these circuits are reset, a time-delay circuit 34 is provided in the control circuit. That is, the base of a transistor 63 in the time-delay circuit 34 is connected to a timing capacitor 62 and a voltage divider including a resistor 61. Therefore, the transistor 63 cannot be conductive until the voltage across the capacitor 62 rises to the threshold value of the transistor 63 with the time constant depending upon the values of the resistor 61 and the capacitor 62.

Therefore, a predetermined time after the transistor 67 becomes conductive, the transistor 63 becomes conductive and consequently a transistor 64 is turned off so that the high, hereinafter referred to as H, H level voltage at the collector of the transistor 64 is applied to the reset terminal R of the driving circuit 26. Therefore, the driving circuit 26 is reset.

Concurrently, this H level signal is applied to one of the two input terminals of a switching circuit 29.

When the transistor 63 becomes conductive, a transistor 65 becomes conductive so that the low, hereinafter referred to as L, level signal is transmitted to the other input terminal of the switching circuit 29, and the first and second photometric circuits 30 and 31, whereby they are reset.

When the transistor 65 becomes conductive, at the time $T_1$, the output Q from a first NAND gate 39 drops from H level to L level as indicated at A in FIG. 4 so that a transistor 40 in a first photometric circuit 30 is turned off, so that the operation of the circuit 30 is started. That is, the light from the subject is intercepted by a photocell 41 so that a timing capacitor 42 is charged with the time constant depending upon the brightness of the subject. After a time interval $\Delta I$ from $T_1$ the voltage across the timing capacitor 42 rises to a threshold voltage of a transistor 43 so that the latter conducts. Consequently the voltage at the collector thereof drops from H level to L level as indicated at C in FIG. 4.

At $T_1$ the output Q of a second NAND gate 38 rises from L level to H level as indicated at B in FIG. 4 while the output from a monostable multivibrator 27 remains at H level as indicated at D in FIG. 4. The outputs from the first photometric circuit 30, second NAND gate 38 and monostable multivibrator 27 and applied to an AND gate 37. At $T_1$ the output from the AND gate 37 is at H level as indicated at F in FIG. 4 since at $T_1$ the inputs thereto are at H level. The H level output from the AND gate 37 is applied through an OR gate 36 to the input terminal T of the driving circuit 26 as the driving pulse so that the step-motor 1 is rotated one step in one direction. At $T_1$ the H level output from the first photometric circuit 30 is also applied to the input terminal W of the driving circuit 26 so that the step-motor 1 may be rotated in the direction in which the shutter blades 4 and 5 are displaced to define the main aperture 10 in the manner described above. On the other hand, when the L level output from the first photometric circuit 30 is applied to the input terminal W the step-motor 1 is rotated in the opposite direction in which the shutter blades 4 and 5 are displaced so as to close the main aperture 10. Thus, at $T_1$ the main aperture 10 is opened to f-16 as indicated at G in FIG. 4.

A driving pulse generator circuit 28 includes the signal-generating gratings 17, light source 18 and photocell 19. As with the first embodiment the light from the light source 18 is intercepted for a short time by the photocell 19 as the shutter blades 4 and 5 are displaced in the opposite directions, so that a transistor 44 becomes conductive. Consequently, as indicated at F in FIG. 4 the voltage at the collector of the transistor 44 drops from H level to L level at $T_2$, whereby a monostable multivibrator 27 is triggered. That is, in response to the trigger pulse applied to an input terminal 48, the monostable multivibrator 27 is triggered so that its output derived from its output terminal 47 drops to L level for $\Delta T_M$ as indicated at D in FIG. 4. At $T_3$ the output from the monostable multivibrator 27 rises again to H level. From $T_1$ to $T_3$ the main aperture 10 remains f-16 as indicated at G in FIG. 4.

At $T_3$ the outputs from the first photometric circuit 30, second NAND gate 38 and monostable multivibrator 27 rise to H level again so that the second driving pulse is applied through the OR gate 36 to the driving circuit 26 as indicated at E in FIG. 4. Therefore, the main aperture 10 is opened to f-8 in the same manner as described above as indicated at G in FIG. 4.

As the shutter blades 4 and 5 are displaced one step, the driving pulse generator circuit 28 generates the trigger pulse in the manner described above at $T_4$, and in response to the second trigger pulse the monostable multivibrator 27 is triggered again, so that its output drops to L level and consequently the second driving pulse drops to L level as indicated at E in FIG. 4. In like manner, the driving pulses may be generated and applied to the driving circuit 26 so that the opening area of the main aperture may be sequentially increased stepwise. However, as described above, the output from the first photometric circuit 30 drops to L level at $T_5$ (that is, $\Delta T$ after $T_1$), so that the shutter opening mode is switched to the shutter closing mode. In other words, from $T_5$ no driving pulse is derived from the AND gate 37. Therefore, in response to two driving pulses shown at E in FIG. 4 the main aperture 10 is opened to and remained at f-8.

If the time constant $\Delta T$ of the first photometric circuit 30 becomes shorter in response to the brightness of the subject, only one driving pulse is derived. On the other hand, when the time constant $\Delta T$ becomes longer, three driving pulses are derived. Thus the opening area of the main aperture may be suitably selected depending upon the brightness of the subject. The embodiment may be of course so modified that the number of f-numbers or apertures defined by the main aperture may be increased and that the opening area of the main aperture 10 may be more precisely defined.

In order to close the shutter, a second photometric circuit 31 including the auxiliary aperture 15 is provided. AT $T_1$ the output Q from the first NAND gate 39 drops to L level so that a transistor 49 in the second photometric circuit 31 is turned off so that the charging of a timing capacitor 50 is started with the time constant depending upon the brightness of the subject; that is, the intensity of the light from the subject intercepted through the auxiliary aperture 15 by the photocell 16. The voltage across the timing capacitor 50 rises as indicated by the line L in FIG. 4, and when it reaches a threshold voltage J of a transistor 51, the latter becomes conductive. The time interval from $T_1$ to the time when the transistor 51 becomes conductive is $\Delta T_S$.

As the transistor 51 becomes conductive, a transistor 53 in a time-delay circuit 32 becomes conductive so that the charging of a time-delaying capacitor 52 is started. After $\Delta T_D$ the voltage across the time-delaying capacitor 52 reaches a threshold voltage of a transistor 54 so that the latter becomes conductive at $T_6$. That is, the time constant $\Delta T_S$ of the second photometric circuit 31 plus the time constant $\Delta T_D$ of the time-delaying circuit 32 after $T_1$, the transistor 54 becomes conductive, so that its output drops to L level. Consequently, the output from an inverter 55 rises to H level at $T_6$ as indicated at K in FIG. 4. This H level output signal is applied to one input terminal of an AND gate 56, while the output from the monostable multivibrator 27 is impressed to the other input terminal of the AND gate 56. At $T_6$ the output from the monostable multivibrator 27 is at H level so that the H level output from the AND gate 56 is transmitted through the OR gate 36 to the driving circuit 26. As a result, the step-motor 1 rotates one step in the opposite direction in which the main aperture 10 is closed to f-16 as indicated at G in FIG. 4.

As the shutter blades 4 and 5 are displaced one step toward their initial position, the trigger pulse is derived from the circuit 28 at $T_7$ in the manner described above, and is applied to the monostable multivibrator 27. As a result, at $T_7$ the driving pulse drops from H level to L level as indicated at L in FIG. 4. After $T_H$; that is, at $T_8$ the output from the monostable multivibrator 27 rises again to H level as indicated by D in FIG. 4 so that both inputs to the AND gate 56 are at H level. As a result, the H level or driving pulse is derived from the AND gate 56, and is applied to the driving circuit 26, so that the step-motor 1 rotates one step in the opposite direction and consequently the main aperture 10 is completely closed as indicated by G in FIG. 4.

As described above, the opening area of the auxiliary aperture 15 is varied in proportion to that of the main aperture 10 so that the quantity of the light from the subject to be intercepted by the photocell 16 may be suitably controlled. Therefore the time constant with which the timing capacitor 50 is charged may be varied in response to the brightness of the subject. That is, the second photometric circuit 31 is a circuit for determining a shutter speed in response to the brightness of the subject. In case of the aperture pre-selection type program controlled shutters including those in accordance with the present invention, the time when the transistor 51 in the second photometric circuit; that is, the time constant of an integrator consisting of the photocell 16 and the timing capacitor 50 must be selected in response to the main aperture set. Therefore, it is possible to electrically change the operating timing of the circuit 31.

A switch 59 is so arranged that when the shutter blades 4 and 5 are opened, it is closed. Therefore a capacitor 58 which has been charged through a resistor 57 is discharged through a resistor 60 so that a transistor 71 conducts. As a result, a capacitor 70 which has been charged through a resistor 72 with the polarities shown is discharged so that the thyristor 69 is forced-commutated and consequently turned off. As a result, a transistor 67 is turned off so that the power supply from the supply source 33 is interrupted and consequently the electromagnet 25 is de-energized. The arm 22 is returned to its initial position under the force of the bias spring 23 in the manner described above, whereby the step-motor 1 is locked in inoperative position.

So far the mode of operation of the preferred embodiment of the present invention has been described, but it will be understood that various modifications can be made without departing the true spirit of the present invention. For instance, instead of the electronic circuits such as the reset circuit 35 and the time-delay circuit 24, a mechanical switch may be positioned adjacent to the arm 22 (See FIG. 2) in such a way that it may be closed when the arm 22 swings to the operative position B, thereby releasing the reset circuit.

The step-motor locking devices in accordance with the present invention may be also advantageously used with the program controlled shutters disclosed in the above copending applications.

What is claimed is:
1. In exposure control device of the type comprising exposure means comprising
   a plurality of shutter blades which also function as the aperture setting blades,
   a setp-motor drivingly coupled to said shutter blades for displacing stepwise said shutter blades, and
   a driving circuit adapted to control the at least one rotation of said step-motor in response to the driving pulse and
pulse signal generating means adapted to generate the driving pulse or pulses in response to the brightness of a subject detected and to apply said driving pulse or pulses to said driving circuit, thereby causing said shutter blades to open and close,
an improvement comprising
   a. step-motor locking means adapted to lock said step-motor in inoperative position when said shutter blades remain closed, and but to release said step-motor when the exposure operation is started,
   b. means adapted to control said step-motor locking means.
2. An improvement as set forth in claim 1 wherein said step-motor locking means comprises
   a. an arm rotatable about a point between the ends thereof and having such a length that one end portion thereof may be selectively brought into contact with at least one of a plurality of driving pins attached to said step-motor and engaged with said shutter blades for driving them,
   b. a bias spring so arranged as to bias said arm in one direction in which said one end portion of said arm is forced to contact and press against said one driving pin when the shutter blades remain closed, thereby locking said step-motor in inoperative position,
   c. an electromagnet positioned in opposed relation with an armature attached to the other end of said arm and adapted to be energized, when the exposure operation is started, to attract said armature, thereby causing said arm to rotate in the opposite direction so as to permit the displacement of said one driving pin and consequently to release said locked step-motor.
3. An improvement as set forth in claim 1 wherein said step-motor locking means comprises
   a. an arm and an assembly of a plurality of permanent magnets attached to a rotary shaft carrying the arm 22 and arrayed in such a way that the N and S poles are arrayed alternately,
   b. an electromagnet adapted to attract a predetermined pair of opposite polarity poles of said permanent magnet assembly when energized.
4. An improvement as set forth in claim 1 wherein said means for controlling said step-motor locking means comprises
   a. a first control circuit adapted to energize said electromagnet when said exposure means and said pulse signal generating means are set in operative state, thereby releasing said step-motor; and
   b. a second control circuit adapted to de-activate said first control circuit when the exposure operation is completed, thereby locking said step-motor in inoperative position again.

* * * * *

UNITED STATES PATENT OFFICE
CERTIFICATE OF CORRECTION

Patent No. 4009866                    Dated March 1, 1977

Inventor(s)   Hiroshi Iwata, et al

It is certified that error appears in the above-identified patent and that said Letters Patent are hereby corrected as shown below:

Column 5, line 15:  "Q" should be -- $\overline{Q}$ --.

Column 6, line 39:  "Q" should be -- $\overline{Q}$ --.

Column 8, line 6:   "setp" should be --step--.

line 8:   "at least one" should be cancelled.

line 9:   After "the" insert --at least one--.

line 10:  There should be a semicolon after "pulse".

line 20:  After "started," insert --and--.

Signed and Sealed this thirtieth Day of August 1977

[SEAL]

Attest:

RUTH C. MASON
Attesting Officer

C. MARSHALL DANN
Commissioner of Patents and Trademarks